Aug. 27, 1940.                D. ARMSTRONG                2,212,972
            TOOL FOR INSERTING OR REMOVING CORPORATION STOPS
                        Filed Sept. 13, 1937
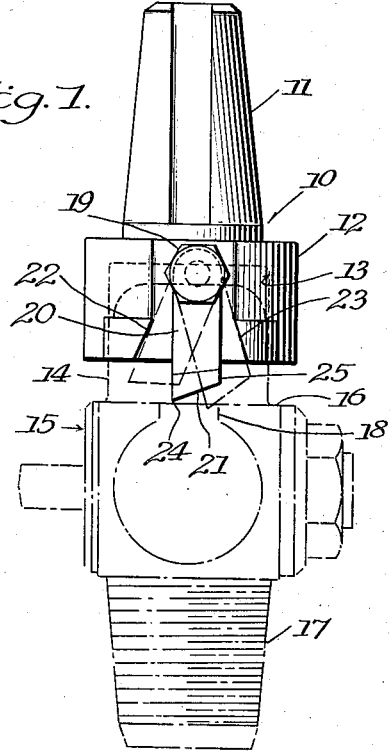
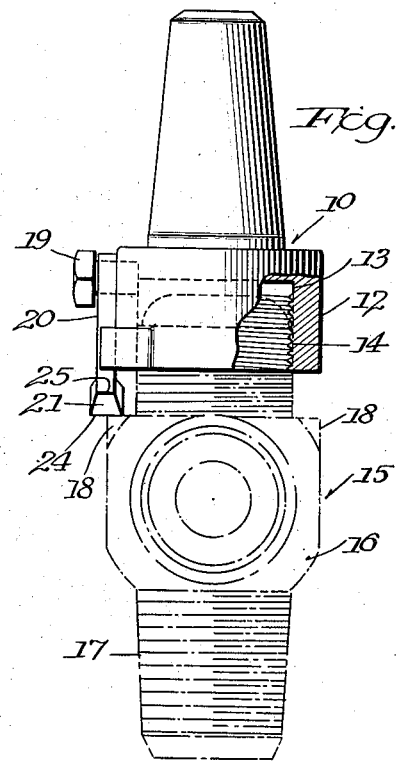
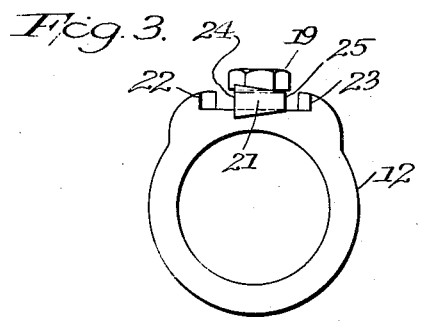
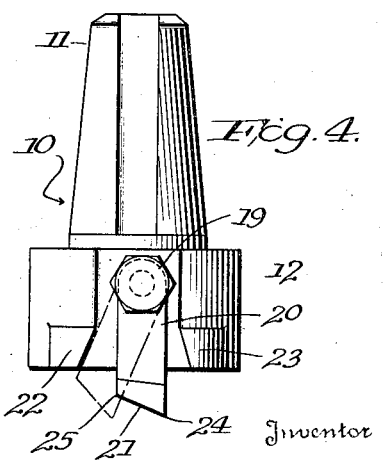
Inventor
David Armstrong.
By Cushman Darby & Cushman
Attorneys Patented Aug. 27, 1940

2,212,972

UNITED STATES PATENT OFFICE 2,212,972

TOOL FOR INSERTING OR REMOVING CORPORATION STOPS

David Armstrong, Bradenton, Fla., assignor to Mueller Co., Decatur, Ill., a corporation of Illinois Application September 13, 1937, Serial No. 163,694

3 Claims. (Cl. 81—53)

The present invention relates to a tool for use in turning corporation stops for the purpose of inserting them in or removing them from gas or water mains and the like. The tool is particularly designed for use with stops of the type shown in the patent to Mix, 1,599,098, issued September 7, 1926, although not necessarily confined in this respect.

Heretofore, tools used, for example, in applying or inserting corporation stops, have relied upon the jamming of the tool with the stop for the transmission of rotation from the former to the latter. In consequence of this jamming effect, the stop has a tendency to follow the tool when it is attempted to remove the latter, and furthermore, the nipple engaged by the tool is occasionally mutilated.

According to the present invention, the tool and stop have coacting abutment portions which engage to transmit rotation from the former to the latter without the nipple being fully received in the socket. Consequently, although the stop is positively driven by the tool, the latter can be turned off with the utmost readiness and without any tendency on the part of the stop to follow. The danger of damage to the stop threads is eliminated.

While the invention may take various forms in embodiment, I have shown a practical design, for illustrative purposes, in the accompanying drawing in which:

Figure 1 is an elevation of the new tool and of a stop of the specific type above mentioned, the tool being shown as partially applied to the stop;

Figure 2 is an elevation of the devices of Figure 1 taken from the right of the latter figure;

Figure 3 is a bottom view of the tool; and

Figure 4 is an elevation of the tool with the parts in different relation.

Referring to the drawing, the tool generally indicated at 10 has a shank portion 11 designed for engagement in the socket of the usual boring bar and a head portion 12 provided with a threaded socket 13 coaxial with the shank portion and adapted to receive the threaded nipple 14 of the stop 15 such as is disclosed in the said patent to Mix. The stop includes a body 16 and a threaded nipple 17 at the end of the body opposite the nipple 14. At the base of the nipple 14 the body has formed thereon diametrically opposite lugs 18.

Pivoted to the head 12 by means of a radially disposed cap screw 19 is a finger 20 which in the position shown in full lines in Figure 1 projects beyond the lower face of the head 12.

As here shown, the finger 20 has parallel sides, and the lower edge 21 is generally disposed in the plane of swing of the finger and inclined to the longitudinal axis of the latter. The range of swing of the finger is limited on one hand by a lug 22 and on the other by a lug 23, these, as shown, being formed integrally with the head portion 12. The angle of swing of the finger is intersected by an axial plane of the tool which includes the pivoting axis of the finger. As here shown, the said angle is substantially bisected by the said plane. Also, as here shown, the point 24 of the finger is somewhat laterally thickened, the sides converging to the heel 25.

In Figures 1 and 2 it is assumed that the tool is being threaded on the nipple 14. If the finger 20 is left freely pendant, it will eventually take behind one of the lugs 18 as the result of the last half turn of the tool and will be borne against the stop 23 before the tool has been fully threaded on the nipple. The stop can then be turned with the tool.

However, if upon reaching the position shown in full lines in Figure 1, the finger is moved to the dotted line position against stop 22 wherein the edge 21 is substantially parallel to the top of lug 18, the tool can be given another turn or two relative to the stop and the finger then released to take the dotted line position against lug 23 with the point 24 well below the top of lug 18 so that there will be no danger of the finger slipping off of the latter. The nipple will still not be fully engaged in the socket so as to cause jamming between parts of the tool and stop. When the stop has been applied the tool is removed by merely reversely rotating it, the finger riding over the lugs 18 in the manner of a pawl.

If it is desired to remove a plug previously inserted, the finger is merely reversed on its pivoting axis so as to be disposed as shown in Figure 4. The tool may then be threaded fully on the nipple 14, the lower end of the finger, in the latter part of the operation, merely riding over the lugs 18 in the manner of a pawl. However, upon reverse rotation of the tool the point 24 will engage securely behind a lug 18 and the stop will be forced to rotate with the tool. Due to the shape of the lower portion of the finger, the tool can be lowered sufficiently relative to the stop so that upon reverse rotation relative to the latter there will not be sufficient rise of the finger to prevent secure engagement thereof in front of the first lug encountered.

While a preferred arrangement is shown, it will be understood that it is only necessary that the swinging finger have limit positions and that in one of them it shall have a greater projection beyond the head than in the other. Various modifications in form and arrangement of parts may be made without departure from the invention as defined in the following claims.

I claim:

1. A tool for use in inserting corporation stops of the type having a body, threaded nipples projecting from opposite ends of said body, and an abutment on the body exterior at the base of one of said nipples, said tool comprising a shank portion and a head portion at one end of said shank portion having a threaded socket therein coaxial with said shank portion and engageable with said one of said nipples, a finger pivoted to said head portion on a substantially radial axis with its free end projecting beyond the face of said head portion opposite said shank portion, and abutments on said head portion at opposite sides of the axial plane of the tool which includes the pivoting axis of the finger and between which said finger is swingable; said finger having a greater range of projection when against the trailing one of said abutments than when against the leading abutment and being maintainable against the leading abutment while said one of said nipples is threaded in said socket to a greater extent, although not to such an extent as would permit jamming, than would be permitted if the finger were against the trailing abutment, the finger being then swingable against the trailing abutment and upon further rotation relative to the stop firmly engaging said body abutment with its leading edge to transmit rotation of the tool to the stop still without jamming of said one of said nipples in said socket; said finger riding over the body abutment as a pawl upon reverse rotation relative to the inserted stop so that the tool is readily removable.

2. A tool according to claim 1 wherein the finger has an angle of swing intersected by the axial plane of the tool which includes the pivoting axis of the finger, and wherein the finger has a lower edge extending generally in the plane of swing of the finger and inclined relative to the longitudinal axis of the finger to provide substantially a point at the free leading end of the finger.

3. A tool according to claim 1 wherein the finger has an angle of swing intersected by the axial plane of the tool which includes the pivoting axis of the finger, wherein the finger has a lower edge extending generally in the plane of swing of the finger and inclined relative to the longitudinal axis of the finger to provide substantially a point at the free leading end of the finger, and wherein the finger is reversible on its pivot, the reversed finger being engageable with the stop body when the tool is applied to the latter to impart reverse rotation of the tool to the stop for removing the latter.

DAVID ARMSTRONG.